(12) United States Patent
Garcia

(10) Patent No.: US 11,704,903 B2
(45) Date of Patent: *Jul. 18, 2023

(54) SYSTEMS AND METHODS FOR HORIZON IDENTIFICATION IN AN IMAGE

(71) Applicant: GoPro, Inc., San Francisco, CA (US)

(72) Inventor: Vincent Garcia, Issy-les-Moulineaux (FR)

(73) Assignee: GoPro, Inc., San Mateo, CA (US)

(*) Notice: Subject to any disclaimer, the term of this patent is extended or adjusted under 35 U.S.C. 154(b) by 226 days.

This patent is subject to a terminal disclaimer.

(21) Appl. No.: 17/118,280

(22) Filed: Dec. 10, 2020

(65) Prior Publication Data

US 2021/0090264 A1 Mar. 25, 2021

Related U.S. Application Data

(63) Continuation of application No. 16/784,679, filed on Feb. 7, 2020, now Pat. No. 10,885,634, which is a continuation of application No. 16/231,001, filed on Dec. 21, 2018, now Pat. No. 10,559,083, which is a
(Continued)

(51) Int. Cl.
| | | |
|---|---|---|
| *G06V 20/10* | (2022.01) | |
| *G06T 7/70* | (2017.01) | |
| *G06T 7/90* | (2017.01) | |
| *G06V 10/50* | (2022.01) | |
| *G06T 7/13* | (2017.01) | |
| *G06V 10/56* | (2022.01) | |

(52) U.S. Cl.
CPC ............... *G06V 20/10* (2022.01); *G06T 7/13* (2017.01); *G06T 7/70* (2017.01); *G06T 7/90* (2017.01); *G06V 10/50* (2022.01); *G06V 10/56* (2022.01)

(58) Field of Classification Search
CPC .... G06T 7/13; G06T 7/70; G06T 7/90; G06V 10/50; G06V 20/10; G06V 10/56
USPC ........................................................ 382/103
See application file for complete search history.

(56) References Cited

U.S. PATENT DOCUMENTS

| | | |
|---|---|---|
| 10,186,036 B1 | 1/2019 | Garcia |
| 10,559,083 B2 | 2/2020 | Garcia |
| 10,885,634 B2 | 1/2021 | Garcia |

(Continued)

FOREIGN PATENT DOCUMENTS

| | | |
|---|---|---|
| EP | 2334058 | 9/2016 |
| WO | 2010073192 | 7/2010 |

OTHER PUBLICATIONS

Avidan, S., et al., "Seam Carving for Content-Aware Image Resizing", ACM Transactions on Graphics (TOG), ACM, vol. 26, No. 3, Article 10, Jul. 1, 2007, XP007904203, 10 pages.

(Continued)

*Primary Examiner* — Charlotte M Baker
(74) *Attorney, Agent, or Firm* — Esplin & Associates, PC

(57) ABSTRACT

Systems and method of identifying a horizon depicted in an image are presented herein. Information defining an image may be obtained. The image may include visual content comprising an array of pixels. The array may include pixel rows. Parameter values for a set of pixel parameters of individual pixels of the image may be determined. Individual average parameter values of the individual pixel parameters of the pixels in the individual pixel rows may be determined. Based on the average parameter values a pixel row may be identified as depicting a horizon in the image.

20 Claims, 4 Drawing Sheets

Related U.S. Application Data continuation of application No. 15/344,412, filed on Nov. 4, 2016, now Pat. No. 10,186,036.

(56) References Cited

U.S. PATENT DOCUMENTS

| | | |
|---|---|---|
| 2004/0017492 A1 | 1/2004 | Stavely |
| 2009/0202177 A1 | 8/2009 | Jeffrey |
| 2009/0226033 A1* | 9/2009 | Sefcik .................... G06V 10/25 382/199 |
| 2016/0110582 A1* | 4/2016 | Mercier ................. G06V 20/13 382/191 |
| 2019/0147596 A1 | 5/2019 | Garcia |
| 2020/0175689 A1 | 6/2020 | Garcia |

OTHER PUBLICATIONS

Hwang, Daw-Sen, et al., "Content-Aware Image Resizing Using Perceptual Seam Carving with Human Attention Model", International Conference on Multimedia and Expo, 2008 IEEE, Piscataway, NJ, Jun. 23, 2008, XP032965469, pp. 1029-1032.

Wang, Yu-Shuen, et al., "Optimized Scale-and-Stretch for Image Resizing", ACM Transactions on Graphics (TOG), ACM, vol. 27, No. 5, Article 118, Dec. 1, 2008, XP002609797, 8 pages.

* cited by examiner

# SYSTEMS AND METHODS FOR HORIZON IDENTIFICATION IN AN IMAGE

FIELD

This disclosure relates to systems and methods configured to identify a horizon in an image.

BACKGROUND

Identifying a horizon depicted in an image may be useful for applying image effects. For example, a horizon may be used for as a reference point for applying one or more of text, text effects (e.g., scrolling, rising up, and/or other text effects), transition effects (e.g., between images), and/or other image effects to an image.

SUMMARY

This disclosure relates systems and methods configured to identify a horizon in an image. In some implementations, a horizon may refer to one or more of a visible line on an image at which the earth's surface (e.g., land or water) and the sky appear to meet and/or a line intended to depict where the earth's surface and the sky appear to meet (e.g., irrespective of a visible demarcating line being depicted in the image). Information defining an image may be obtained. The information defining the image may include, for example, an image file. The image file may be obtained from electronic storage of one or more image capture devices and/or other storage locations.

A system that identifies a horizon in an image may include one or more physical processors and/or other components. The one or more physical processors may be configured by machine-readable instructions. Executing the machine-readable instructions may cause the one or more physical processors to facilitate identifying a horizon in an image. The machine-readable instructions may include one or more computer program components. The computer program components may include one or more of an image component, a parameter component, an identification component, an effects component, and/or other computer program components.

The image component may be configured to obtain information defining one or more images. An image may include visual content. The visual content may be presented in the form of an array of pixels of the image. An individual array of pixels may include multiple pixel rows. The information defining the image may define individual colors of individual pixels.

The parameter component may be configured to determine parameter values for pixel parameters of individual pixels of an image. By way of non-limiting illustration, the pixel parameters may include one or more of a first pixel parameter, a second pixel parameter, and/or other pixel parameters.

The parameter component may be configured to determine, for individual pixel rows in a pixel array of an image, individual average parameter values of the parameter values of the individual pixel parameters of the pixels in the individual pixel rows. By way of non-limiting illustration, for a first pixel row, the parameter component may be configured to determine one or more of a first average parameter value of the first pixel parameter, a second average parameter value of the second pixel parameter, and/or other average parameter values of the parameter values of the individual pixel parameters of the pixels in the first pixel row.

The identification component may be configured to identify, based on the individual average parameter values of the individual pixel parameters of pixels in the individual pixel rows, a pixel row as depicting a horizon in an image.

The effects component may be configured to effectuate one or more image effects on individual images based on individual identified pixel rows.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
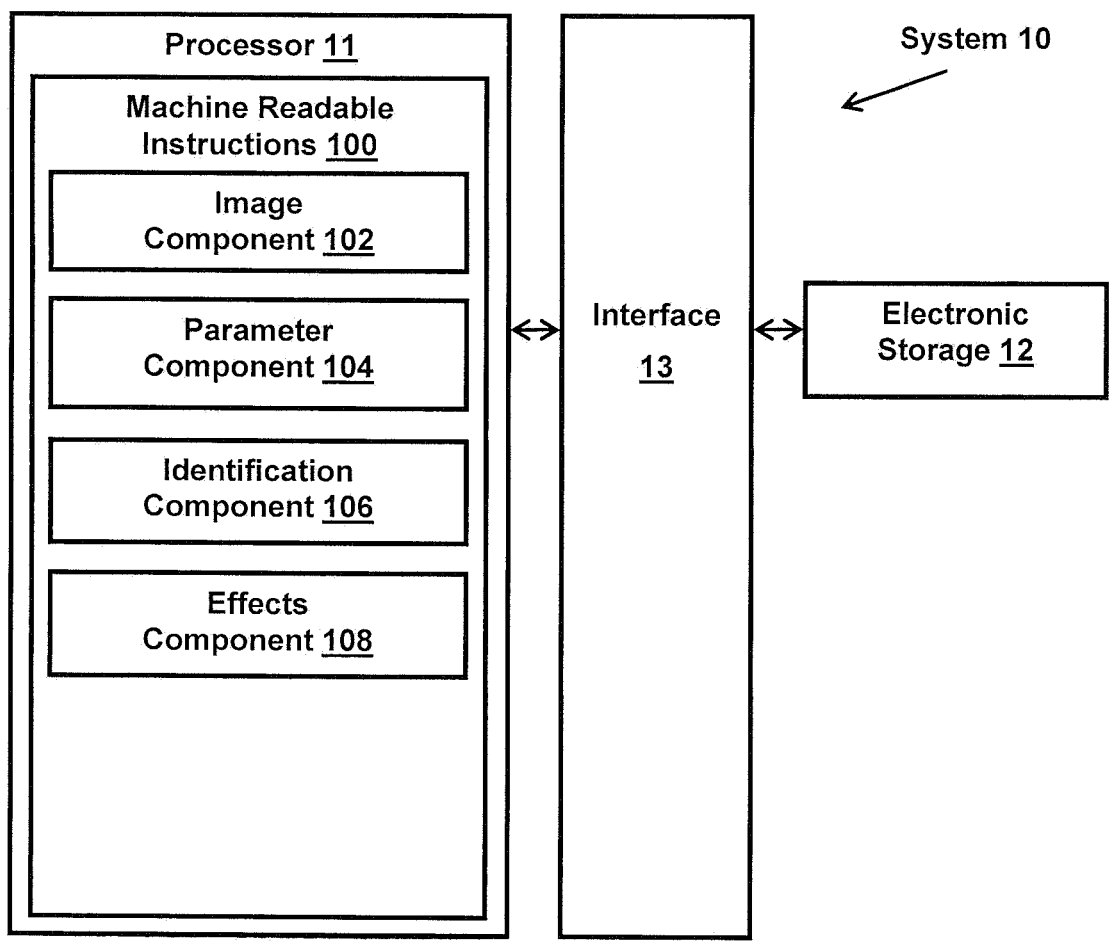
FIG. 1 illustrates a system configured to identify a horizon in an image, in accordance with one or more implementations.

FIG. 1 illustrates a system 10 configured to identify a horizon in an image, in accordance with one or more implementations. System 10 may include one or more of a processor 11, electronic storage 12, interface 13 (e.g., bus, wireless interface, etc.), and/or other components. Electronic storage 12 may include electronic storage medium that electronically stores information. Electronic storage 12 may store software algorithms, information determined by processor 11, information received remotely, and/or other information that enables system 10 to function properly. For example, electronic storage 12 may store information related to one or more of images, videos, image exemplars, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured by machine readable instructions 100. Executing machine-readable instructions 100 may cause processor 11 to identify a horizon in an image. Machine-readable instructions 100 may include one or more computer program components. Machine readable instructions 100 may include one or more of an image component 102, a parameter component 104, an identification component 106, an effects component 108, and/or other computer program components.

In some implementations, processor 11 may be included in one or more of a server (not shown), a computing platform (not shown), a capture device (not shown), and/or other devices. By way of non-limiting illustration, a server may include processor 11 and may communicate with computing platforms via client/server architecture and/or other communication scheme. The server may be configured to provide features and/or functions of processor 11 to users via computing platforms. In some implementations, one or more features and/or functions of processor 11 may be attributed to individual computing platforms associated with users. By way of non-limiting illustration, individual computing platforms may obtain machine-readable instructions that are the same or similar to machine-readable instructions 100 such that features and/or functions of processor 11 may be carried out locally at the individual computing platforms. In some implementations, one or more features and/or functions of processor 11 may be attributed to individual capture devices. By way of non-limiting illustration, individual capture devices may obtain machine-readable instructions that are the same or similar to machine-readable instructions 100 such that features and/or functions of processor 11 may be carried out locally at the individual capture devices. A computing platform may include one or more of a desktop computer, a laptop computer, a smartphone, a tablet computer, and/or other computing platform. It is noted that in some implementations, system 10 may include one or more of one or more servers, one or more computing platforms, one or more capture devices, and/or other components described herein yet not explicitly shown in FIG. 1.

Image component 102 may be configured to obtain information defining one or more images, and/or other information. Information defining an image may include, for example, an image file. An image file may be obtained from electronic storage of one or more capture devices and/or other storage locations. An image may include visual content and/or other content. The visual content of an image may be in the form of a pixel array. Information defining an image may define colors of individual pixels in a pixel array of the image. In some implementations, a pixel array may include multiple pixel rows, and/or other configurations of pixels.

In some implementations, visual content may be defined by one or more of real-world visual information, electronic information, playback information, and/or other information. Real-world visual information may comprise information related to light and/or electromagnetic radiation incident on an image sensor of a capture device, and/or other information. Electronic information may comprise information related to information stored by in electronic storage that conveys the light and/or electromagnetic radiation incident on an image sensor and may constitute a conversion of the real-world visual information to information suitable for electronic storage. Playback information may comprise information that may facilitate visual reproduction of the captured real-world visual information on a computing platform and/or other display device for viewing by a user, and/or other information. By way of non-limiting example, playback information may comprise a different format of the electronic information that may be readable by a playback device (e.g., a computing platform and/or other devices).

In some implementations, an image may depict a scene. The scene may include scene content. The scene content may include depictions of one or more of people, objects, sky, landscapes, ocean, a horizon, and/or other content. In some implementations, a horizon may refer to one or more of a visible line within an image at which the earth's surface and the sky appear to meet and/or a line intended to depict where the earth's surface and the sky meet. A horizon may comprise a straight line. A horizon may extend horizontally across a plane of an image. In some implementations, a horizon may be identified in an image whether or not a demarcating line may be visible in the image. By way of non-limiting illustration, an image depicting a mountain landscape may not visibly depict a horizontal horizon line, however, a row of pixels may be identified as a line intending to depict a horizon.

In some implementations, individual pixel colors may be specified by values of one or more color components (also referred to as "color channels"), and/or other information. For example, individual colors may be specified with respect to a color space and/or other specifications. A color space may include one or more of an RGB color space, sRGB color space, an RGBY colors pace, a CMYK color space, and/or other color space representations. A color specified within a color space may be defined by chromaticities of different color components associated with the space, and/or other information. For example, an RGB color space may specify color component values by chromaticities of red, green, and/or blue additive components (e.g., a red color channel, a green color channel, and a blue color channel); and an RGBY color space may specify color component values by chromaticities of red, green, blue, and yellow components (e.g., a red color channel, a green color channel, a blue color channel, and a yellow color channel). In some implementations, a component within a color space may further include a luminance component. A value of a luminance component may specify a luminous intensity of a pixel, and/or other information.

In some implementations, information defining one or more images may be obtained from information defining one or more videos. Information defining a video may include, for example, a video file. A video file may be obtained from electronic storage of one or more capture devices and/or other storage locations. A video may include one or more of visual content, audio content, and/or other content. The visual content may be in the form of individual pixel arrays of individual frame images in a set of multiple frame images. Information defining a video may define colors of individual pixels in individual pixel arrays of individual frame images. The multiple frame images may be presented in an ordered sequence. The audio content may include recorded and/or provided audio that may accompany visual content. The audio content may be synchronized with visual content.

A capture device information may include one or more sensors coupled to the capture device, and/or other components. A capture device may be configured for one or both of video capture and/or image capture. In some implementations, sensors coupled to a capture device may include one or more of an image sensor, a geo-location sensor, orientation sensor, accelerometer, and/or other sensors. An image sensor may be configured to generate output signals conveying light and/or electromagnetic radiation incident on the image sensor, and/or other information. In some implementations, an image sensor may comprise one or more of a photosensor array (e.g., an array of photosites), a charge-coupled device sensor, an active pixel sensor, a complementary metal-oxide semiconductor sensor, an N-type metaloxide-semiconductor sensor, and/or other image sensors. A geo-location sensor may generate output signals conveying location(s) of a capture device. An orientation sensor may be configured to generate output signals conveying orientation of a capture device and/or entity moving with a capture devices. An accelerometer may be configured to generate output signals conveying physical acceleration experienced by a capture device and/or entity moving with the capture device.

Image component 102 may be configured to obtain information defining one or more images from one or more storage locations. A storage location may include electronic storage 12, electronic storage of one or more capture devices (not shown in FIG. 1), electronic storage of one or more computing platforms (not shown in FIG. 1), and/or other storage locations. Image component 102 may be configured to obtain information defining one or more images during acquisition of the information and/or after acquisition of the information by one or more capture devices. For example, image component 102 may obtain information defining one or more images while the one or more images are being captured by one or more capture devices. Image component 102 may obtain information defining one or more images after the one or more images have been captured and/or stored in memory (e.g., electronic storage 12, etc.). In some implementations, one or more videos may be characterized by one or more encoded framerates. An encoded framerate may define a number of frame images within a video per a time duration (e.g., number of frame images per second, etc.).

While one or more implementations of features present in this disclosure may be directed to individual images, one or more other implementations of the system may be configured for other types media content. Other types of media content may include one or more of multimedia presentations, photos, slideshows, burst shot images, and/or other media content.

Parameter component 104 may be configured to determine one or more parameter values for pixel parameters of individual pixels of individual images. The pixel parameters may include a set of pixel parameters. The set of pixel parameters may include one or more of color parameters, image gradient parameters, and/or other pixel parameters.

Individual parameter values of color parameters of individual pixels may specify one or more of chromaticity of individual color components of individual pixels, luminous intensity of individual color components of individual pixels, and/or other information. For example, color parameters may include one or more of a first color parameter, a second color parameter, a third color parameter, a fourth color parameter, and/or other color parameters.

A parameter value of the first color parameter may specify one or more of a chromaticity of a first color component of an individual pixel, a luminous intensity of the first color component of an individual pixel, and/or other information. By way of non-limiting illustration, in an RGBY color space, the first color component may be the red color component (e.g., red color channel); and a parameter value of the first color parameter may specify one or more of a chromaticity of the red color component, a luminous intensity of the red color component, and/or other information.

A parameter value of the second color parameter may specify one or more of a chromaticity of a second color component of an individual pixel, a luminous intensity of the second color component of an individual pixel, and/or other information. By way of non-limiting illustration, in an RGBY color space, the second color component may be the green color component (e.g., green color channel); and a parameter value of the second color parameter may specify one or more of a chromaticity of the green color component, a luminous intensity of the green color component, and/or other information.

A parameter value of the third color parameter may specify one or more of a chromaticity of a third color component of an individual pixel, a luminous intensity of the third color component of an individual pixel, and/or other information. By way of non-limiting illustration, in an RGBY color space, the third color component may be the blue color component (e.g., blue color channel); and a parameter value of the third color parameter may specify one or more of a chromaticity of the blue color component, a luminous intensity of the blue color component, and/or other information.

A parameter value of the fourth color parameter may specify one or more of a chromaticity of a fourth color component of an individual pixel, a luminous intensity of the fourth color component of an individual pixel, and/or other information. By way of non-limiting illustration, in an RGBY color space, the fourth color component may be the yellow color component (e.g., yellow color channel); and a parameter value of the fourth color parameter may specify one or more of a chromaticity of the yellow color component, a luminous intensity of the yellow color component, and/or other information. It is noted that for other color space representations of colors, the quantity and/or type of color parameters may be more or less than those described above.

Individual parameter values of individual image gradient parameters may specify one or more of an image gradient at a pixel in a first direction, an image gradient at a pixel in a second direction, a magnitude of an image gradient, and/or other information. For example, image gradient parameters may include one or more of a first image gradient parameter, a second image gradient parameter, a gradient magnitude parameter, and/or other parameters. The first image gradient parameter may correspond to an image gradient in a first direction; the second image gradient parameter may correspond to an image gradient in a second direction; and the gradient magnitude parameter may correspond to a magnitude of an image gradient.

In some implementations, image gradient may refer directional change in one or both of intensity or color of an image. In some implementations, image gradient at individual pixels may comprise a 2D vector with vector components given by derivatives in a first direction (e.g., horizontal direction) and a second direction (e.g., vertical direction). At individual pixels, an image gradient vector may point in a direction of a largest possible intensity increase, and/or a length of the gradient vector may correspond to a rate of change in that direction.

Parameter component 104 may be configured to determine individual image gradients of individual images. In some implementations, an image gradient in a first direction, a second direction and/or a magnitude of image gradient may be determined from an image by applying one or more filters to the image, and/or by other techniques. A filter may include one or more of a Sobel filter, Sobel-Feldman filter, Scharr filter, Roberts Cross filter, Prewitt filter, Laplacian filter, Gabor filter, DoG (difference of Gaussians) filters, DoH (determinant of Hessian) filter, and/or other techniques.

Parameter component 104 may be configured to determine, for individual pixel rows in individual pixel arrays of individual images, individual secondary parameter values of the individual pixel parameters of the pixels in the individual pixel rows. A secondary parameter value may comprise one or more of an average of parameter values of individual pixel parameters of pixels in individual pixel rows, a weighted average of parameter values of individual pixel parameters of pixels in individual pixel rows, a median of parameter values of individual pixel parameters of pixels in individual pixel rows, a mode of parameter values of individual pixel parameters of pixels in individual pixel rows, statistics on neighborhood information, entropy of the row, and/or other secondary measures of parameter values of an individual parameter value of pixels in individual pixel rows.

By way of non-limiting illustration, an image may comprise an array of pixels having multiple pixel rows. The pixel rows may include a first pixel row and/or other pixel rows. The first pixel row may comprise multiple pixels. For the first pixel row, parameter component 104 may be configured to determined one or more of a first set of parameter values of a first pixel parameter of the pixels in the first pixel row, a second set of parameter values of a second pixel parameter of the pixels in the first pixel row, a third set of parameter values of a third pixel parameter of the pixels in the first pixel row, a fourth set of parameter values of a fourth pixel parameter of the pixels in the first pixel row, a fifth set of parameter values of a fifth pixel parameter of the pixels in the first pixel row, a sixth set of parameter values of a sixth pixel parameter of the pixels in the first pixel row, a seventh set of parameter values of a seventh pixel parameter of the pixels in the first pixel row, and/or more or fewer parameter values.

Parameter component 104 may be configured to determine, for the first pixel row, one or more of a first average parameter value of the first set of parameter values, a second average parameter value of the second set of parameter values, a third average parameter value of the third set of parameter values, a fourth average parameter value of the fourth set of parameter values, a fifth average parameter value of the fifth set of parameter values, a sixth average parameter value of the sixth set of parameter values, a seventh average parameter value of the seventh set of parameter values, and/or other secondary parameter values. In some implementations, the first pixel parameter may comprise a first color parameter, the second pixel parameter may comprise a second color parameter, the third pixel parameter may comprise a third color parameter, the fourth pixel parameter may comprise a fourth color parameter, the fifth pixel parameter may comprise a first image gradient parameter, the sixth pixel parameter may comprise a second image gradient parameter, and/or the seventh pixel parameter may comprise a gradient magnitude parameter.

While the above illustrates determining average parameter values, in other implementations, other secondary parameter values of pixel parameters of pixels in individual pixel rows may be determined.

Identification component 106 may be configured to identify individual pixel rows in individual images as depicting a horizon. In some implementations, a pixel row may be identified within an image based on one or more secondary parameter values of individual pixel parameters of pixels in individual pixel rows of the image. For example, identification component 106 may be configured to identify a pixel row as depicting a horizon in the image based on average parameter values of individual pixel parameters of pixels in the individual pixel rows.

In some implementations, one or more pixel rows may be identified as depicting a horizon in an image by one or more machine learning techniques, and/or other techniques. Machine learning techniques may include one or more of a convolutional neural network, decision tree learning, supervised learning, minimax algorithm, unsupervised learning, semi-supervised learning, reinforcements learning, deep learning, artificial neural networks, support vector machine, clustering algorithms, genetic algorithms, random forest, and/or other techniques. In some implementations, one or more user-provided exemplars of images having one or more user-identified pixel rows that depict a horizon may be utilized at an initialization or training stage of a machine learning process. The user-provided exemplars may include identifications of one or more pixel rows in individual images as being a horizon depicted in the image. Parameter values and/or secondary parameter values of one or more pixel parameters of the identified pixels rows in the user-provided exemplars may be determined. The parameter values and/or secondary parameter values of the identified pixels rows may be used to train a machine learning process to identify a pixel row as depicting a horizon. A quantity of exemplars suitable to train a machine-learning network may be provided, for example, one or more of 1,000 images, 10,000 images, 100,000 images, 1,000,000 images, and/or other quantities of images having user-identified pixels rows.

In some implementations, information input into a trained machine learning process may include secondary parameter values (e.g., average parameter values and/or other secondary parameters) of individual pixel parameters of pixels in individual pixel rows of an image (e.g., determined from parameter component 104). In some implementations, the secondary parameter values may be input as a matrix, wherein individual rows in the matrix correspond to individual pixel rows of an image, and individual values in individual columns of the matrix comprise individual secondary pixel values of individual pixel parameters in a set of pixel parameters. A trained machine learning process may be configured to classify individual rows in the matrix (e.g., corresponding to individual rows of pixels) as either being indicative of a horizon or not. In some implementations, a set of multiple rows in an image may be classified as depicting a horizon. In some implementations, a single row in a set of rows may be identified as the horizon based on one or more of user selection, gradient analysis, selecting a middle row, random selection, and/or other techniques.

Figure 6:
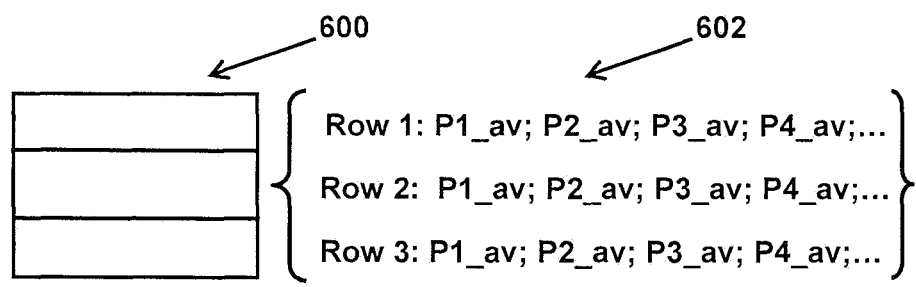
FIG. 6 illustrates an exemplary matrix of average parameter values generated for an image having three pixel rows, in accordance with one or more implementations.

By way of non-limiting illustration in FIG. 6, consider an image 600 with 3 pixel rows; and a set of pixel parameters (e.g., labeled P1, P2, P3, and P4). The set of pixel parameters may comprise one or more of one to four color parameters, an image gradient parameter in one direction, an image gradient parameter in another direction, a magnitude of an image gradient parameter, and/or other parameters. Parameter component 104 (FIG. 1) may be configured to determine secondary parameter values (e.g., an average) of individual pixel parameters of pixels in individual ones of the pixel rows. In this example, parameter component 104 may be configured to determined four secondary parameter values of the set of pixel parameters (e.g., labeled P1_av, P2_av, P3_av, and P4_av) for individual ones of the pixel rows. Identification component 106 (FIG. 1) may be configured to generate a matrix 602 that has three rows (e.g., corresponding to individual ones of the three pixel rows) and four columns (e.g., corresponding to individual ones of the four secondary parameter values).

It is noted the image and matrix shown in FIG. 6 is for illustrative purposes only and not to be considered limiting. For example, in some implementations an image may comprise more than three rows; and a matrix may be generated using secondary parameter values of a set of pixel parameters comprising more than four pixel parameters. By way of non-limiting illustration, a set of pixel parameters may include seven pixel parameters comprising four color parameters, an image gradient parameter in one direction, an image gradient parameter in another direction, and a magnitude of an image gradient parameter.

Returning to FIG. 1, in some implementations, an array of pixels of an individual image may be split into a set of sub-arrays of pixels. An individual sub-array of pixels may correspond to an individual vertical strip of the individual image. In some implementations, the array of pixels of the individual image may be split into "N" sub-arrays of pixels. For example, an image may be split into "N" vertical strips, wherein individual strips may include an individual sub-array or pixels. For example, an image may be split into 3 (e.g., N=3) vertical strips (or other amounts) forming 3 sub-arrays of pixels. The parameter component 104 may be configured to determine, for individual pixel rows in individual sub-arrays of pixels, individual secondary parameter values of the individual pixel parameters of the pixel rows in the individual sub-arrays of pixels. The identification component 106 may be configured to use the individual secondary parameter values determined for the individual rows in the individual sub-arrays of pixels as input into a machine learning process to identify a horizon in the image. The machine learning process may be trained in a similar manner. The idea behind this is that it may bring some locality into the input provided to the machine learning process.

By way of non-limiting illustration, consider an array of pixels of an image. The image may be split into N vertical strips such that the array of pixels may be split into N sub-arrays of pixels. For individual pixel rows in individual ones of the sub-arrays of pixels, parameter component may be configured to determine individual secondary parameter values of the individual pixel parameters. If M pixel parameters are used, then individual pixel rows may have M×N secondary parameter values used as input into the machine learning process. By way of non-limiting illustration, the image may include a first row of pixels that may span the width of the image. Consequently, the first row (along with other rows) may be split into N segments of the first row. For example, if N=3, the first row of pixels may be split into 3 segments (e.g., a first segment, a second segment, and a third segment). For individual segments, individual secondary parameter values of the individual pixel parameters may be determined and used as input into a machine learning process. For example, the first row may be assigned a first set of secondary parameter values of the individual pixel parameters determined from the first segment, a second set of secondary parameter values of the individual pixel parameters determined from the second segment, and a third set of secondary parameter values of the individual pixel parameters determined from the third segment. Other rows of the image may be handled similarly.

Figure 3:
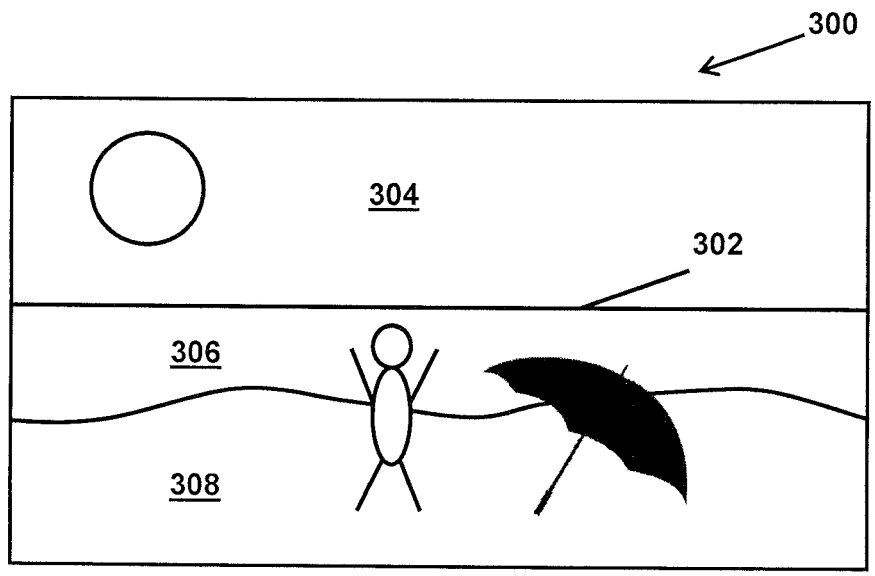
FIG. 3 illustrates an exemplary image.

FIG. 3 illustrates an exemplary image 300 used for horizon identification using one or more implementations of system 100 (FIG. 1) presented herein. The image 300 may depict a scene, for example, a beach scene including depictions of sky 304, ocean 306, land 308, and/or other scene content. The image 300 may depict a horizon 302 in the form of a horizontal line extending across the image. The horizon 302 may comprise a line at which the earth's surface (e.g., ocean 306) and sky 304 appear to meet. One or more implementations of system 100 (FIG. 1) may be configured to identify a row of pixels corresponding to horizon 302.

Figure 4:
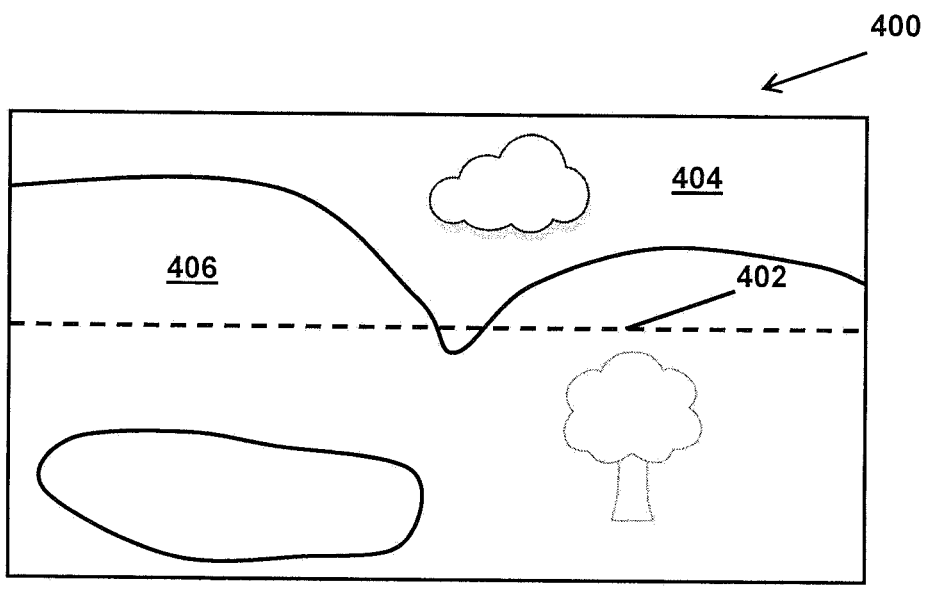
FIG. 4 illustrates an exemplary image.

FIG. 4 illustrates an exemplary image 400 used for horizon identification using one or more implementations of system 100 (FIG. 1) presented herein. The image 400 may depict a scene, for example, a mountain landscape including depictions of sky 404, mountain range 406, and/or other scene content. The image 400 may not explicitly depict a visible horizon comprising a horizontal demarcation line. One or more implementations of system 100 (FIG. 1) may be configured to identify a row of pixels corresponding to a line 402 as "depicting" a horizon in the image 400.

Returning to FIG. 1, effects component 108 may be configured to effectuate one or more image effects on individual images based on individual identified pixel rows. Image effects may include one or more of text, text effects, transition effects, and/or other image effects. Image effects may be determined through user input via one or more image editing interfaces and/or applications (not shown in FIG. 1). In some implementations, effectuating one or more image effects on individual images based on individual identified pixel rows may comprise utilizing individual identified pixel rows as a reference line for image effects. Utilizing individual identified pixel rows as a reference line for text and/or text effects may comprise overlaying text at or near the individual identified pixel rows, scrolling text across the individual identified pixel rows, scrolling text above and/or below the individual identified pixel rows. Utilizing individual identified pixel rows as a reference line for transition effects may comprise fading in and/or out of an image at an identified pixel rows, horizontal flip, vertical reflection, adjust position of the crop based on identified pixel rows, and/or other transition effects.

Figure 5:
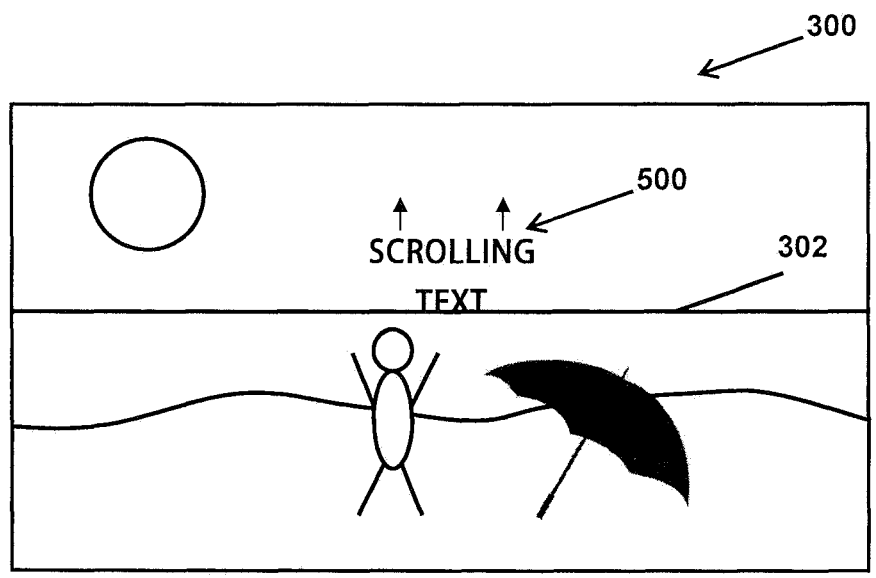
FIG. 5 illustrates a text effect applied to an image having a row of pixels identified as depicting a horizon.

By way of non-limiting illustration in FIG. 5, image 300 is shown having a text effect 500 applied to image 300 using a row of pixels identified as depicting horizon 302. The text effect 500 may include scrolling text that may appear from behind horizon 302 as it scrolls upward. It is noted that text effect 500 shown in FIG. 5 is for illustrative purposes only and is not to be considered limiting. For example, in other implementations, other image effects may be applied to images using a row of pixels that may be identified as depicting a horizon.

Returning to FIG. 1, although processor 11 and electronic storage 12 are shown to be connected to an interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware;

firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, and/or 108 may be eliminated, and some or all of its functionality may be provided by other computer program components. As another example, processor 11 may be configured to execute one or more additional computer program components that may perform some or all of the functionality attributed to one or more of computer program components 102, 104, 106, and/or 108 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may include one or more virtual storage resources (e.g., cloud storage, a virtual private network, and/or other virtual storage resources). Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
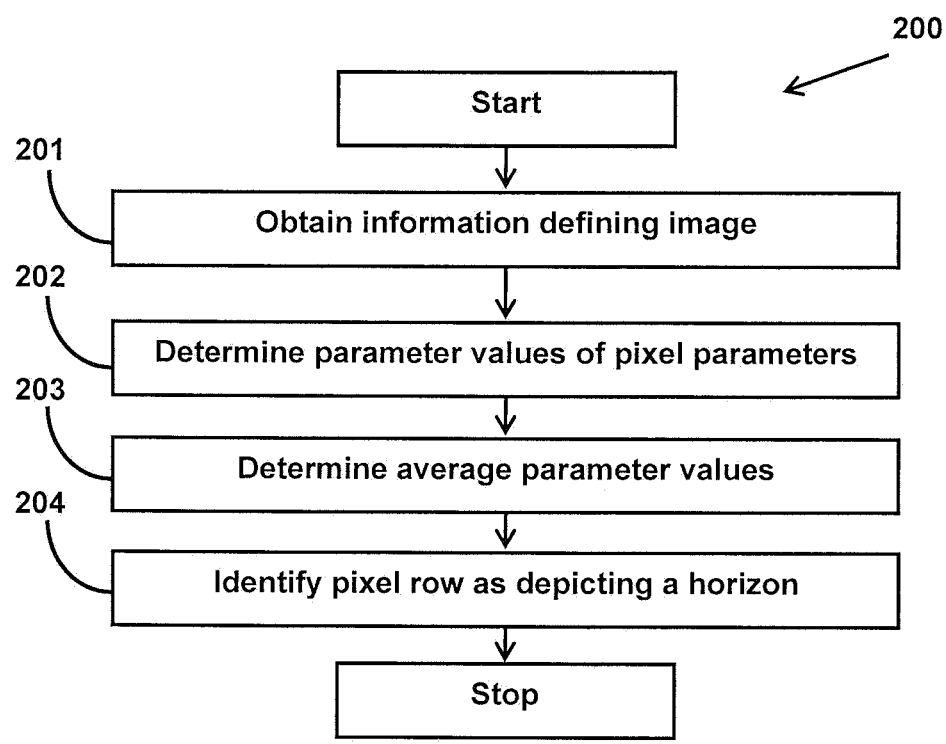
FIG. 2 illustrates a method of identifying a horizon in an image, in accordance with one or more implementations.

FIG. 2 illustrates method 200 of identifying a horizon in an image, in accordance with one or more implementations. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in a computer system comprising one or more of one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information), non-transitory electronic storage storing machine-readable instructions, and/or other components. The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, information defining one or more images may be obtained. Individual images may include visual content and/or other content. The visual content may comprise an array of pixels. The information defining an individual image may define individual colors for individual pixels in a pixel array of the image. An array of pixels may include multiple pixel rows. In some implementations, operation 201 may be performed by a processor component the same as or similar to image component 102 (shown in FIG. 1 and described herein).

At operation 202, parameter values for a set of pixel parameters of individual pixels of individual images may be determined. The set of pixel parameters may include a first pixel parameter and/or other pixel parameters. In some implementations, operation 202 may be performed by a processor component the same as or similar to parameter component 104 (shown in FIG. 1 and described herein).

At operation 203, for individual pixel rows, individual average parameter values of the individual pixel parameters of pixels in individual pixel rows may be determined. By way of non-limiting illustration, for a first pixel row, a first average parameter value of the first pixel parameter and/or other average parameter values of other pixel parameters may be determined. In some implementations, operation 203 may be performed by a processor component the same as or similar to parameter component 104 (shown in FIG. 1 and described herein).

At operation 204, individual pixel rows in individual images may be identified as depicting a horizon in the individual images. The identification may be based on average parameter values of individual pixel parameters of pixels in individual pixel rows of individual images. In some implementations, operation 204 may be performed by a processor component the same as or similar to identification component 106 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to identify a horizon in an image, the system comprising:

one or more physical processors configured by machine-readable instructions to:

obtain information defining an image, the image comprising an array of pixels, the array including pixel rows, individual pixels in the array associated with parameter values for a set of pixel parameters, individual pixel rows in the array associated with secondary parameter values for the set of pixel parameters, the secondary parameter values determined based on an average, a weighted average, a median, a mode, and/or an entropy of corresponding parameter values of the pixels in the individual pixel rows;
identify one or more of the pixel rows of the image as depicting the horizon in the image based on the secondary parameter values; and
effectuate an image effect based on the identification of the one or more identified pixel rows of the image as depicting the horizon in the image.

2. The system of claim 1, wherein the set of pixel parameters includes one or more of a first color parameter, a second color parameter, a third color parameter, a fourth color parameter, a first image gradient parameter, a second image gradient parameter, or a gradient magnitude parameter.

3. The system of claim 2, wherein the first color parameter corresponds to a first color component of individual colors of pixels in the array, the second color parameter corresponds to a second color component of the individual colors of the pixels in the array, the third color parameter corresponds to a third color component of the individual colors of the pixels in the array, the fourth color parameter corresponds to a fourth color component of the individual colors of the pixels in the array, the first image gradient parameter corresponds to an image gradient at the individual pixels in the array in a first direction, the second image gradient parameter corresponds to an image gradient at the individual pixels in the array in a second direction, and the gradient magnitude parameter corre p nds to a magnitude of the image gradient at the individual pixels in the array.

4. The system of claim 3, wherein the first color component, second color component, third color component, and fourth color component correspond to individual colors channels within an RGBY color space, and wherein parameter values of the first color component, second color component, third color component, and fourth color component are luminous intensities associated with the individual color channels.

5. The system of claim 1, wherein the image depicts a scene including scene content, wherein the one or more identified pixel rows are identified as depicting the horizon in the image irrespective of the scene content including a visual depiction of the horizon.

6. The system of claim 1, wherein the image effect includes an overlaying of text at or near the one or more identified pixel rows, a scrolling of text across the one or more identified pixel rows, a scrolling of text above or below the one or more identified pixel rows, a fading in or a fading out at the one or more identified pixel rows, or an adjustment of crop position based on the one or more identified pixel rows.

7. The system of claim 1, wherein the image depicts a scene including scene content, wherein the one or more identified pixel rows are identified as depicting the horizon in the image based on the scene content at the one or more identified pixel rows including a visual depiction of the horizon.

8. The system of claim 1, wherein the image depicts a scene including scene content, wherein the one or more identified pixel rows are identified as depicting the horizon in the image irrespective of the scene content including a visual depiction of the horizon.

9. The system of claim 1, wherein identifying the one or more of the pixel rows as depicting the horizon comprises identifying, based on the secondary parameter values of the individual pixel parameters of the pixels in the individual pixel rows, a set of pixel rows and selecting the one or more identified pixel rows from the set of pixel rows.

10. The system of claim 1, wherein identifying the one or more of the pixel rows as depicting the horizon in the image comprises generating a matrix, the matrix having rows corresponding to individual pixel rows and columns corresponding to individual secondary parameter values of individual pixel parameters in the set of pixel parameters.

11. A method of identifying a horizon in an image, the method being implemented in a computer system comprising one or more physical processors and non-transitory electronic storage media storing machine-readable instructions, the method comprising:
obtaining information defining an image, the image comprising an array of pixels, the array including pixel rows, individual pixels in the array associated with parameter values for a set of pixel parameters, individual pixel rows in the array associated with secondary parameter values for the set of pixel parameters, the secondary parameter values determined based on an average, a weighted average, a median, a mode, and/or an entropy of corresponding parameter values of the pixels in the individual pixel rows;
identifying one or more of the pixel rows of the image as depicting the horizon in the image based on the secondary parameter values; and
effectuating an image effect based on the identification of the one or more identified pixel rows of the image as depicting the horizon in the image.

12. The method of claim 11, wherein the set of pixel parameters includes one or more of a first color parameter, a second color parameter, a third color parameter, a fourth color parameter, a first image gradient parameter, a second image gradient parameter, or a gradient magnitude parameter.

13. The method of claim 12, wherein the first color parameter corresponds to a first color component of individual colors of pixels in the array, the second color parameter corresponds to a second color component of the individual colors of the pixels in the array, the third color parameter corresponds to a third color component of the individual colors of the pixels in the array, the fourth color parameter corresponds to a fourth color component of the individual colors of the pixels in the array, the first image gradient parameter corresponds to an image gradient at the individual pixels in the array in a first direction, the second image gradient parameter corresponds to an image gradient at the individual pixels in the array in a second direction, and the gradient magnitude parameter corresponds to a magnitude of the image gradient at the individual pixels in the array.

14. The method of claim 13, wherein the first color component, second color component, third color component, and fourth color component correspond to individual colors channels within an RGBY color space, and wherein parameter values of the first color component, second color component, third color component, and fourth color component are luminous intensities associated with the individual color channels.

15. The method of claim 11, wherein identifying the one or more of the pixel rows as depicting the horizon in the image comprises generating a matrix, the matrix having rows corresponding to individual pixel rows and columns corresponding to individual secondary parameter values of individual pixel parameters in the set of pixel parameters.

16. The method of claim 11, wherein the image effect includes an overlaying of text at or near the one or more identified pixel rows, a scrolling of text across the one or more identified pixel rows, a scrolling of text above or below the one or more identified pixel rows, a fading in or a fading out at the one or more identified pixel rows, or an adjustment of crop position based on the one or more identified pixel rows.

17. The method of claim 11, wherein the image depicts a scene including scene content, wherein the one or more identified pixels rows are identified as depicting the horizon in the image based on the scene content at the one or more identified pixel rows including a visual depiction of the horizon.

18. The method of claim 11, wherein the image depicts a scene including scene content, wherein the one or more identified pixel rows are identified as depicting the horizon in the image irrespective of the scene content including a visual depiction of the horizon.

19. The method of claim 11, wherein identifying the one or more of the pixel rows as depicting the horizon comprises identifying, based on the secondary parameter values of the individual pixel parameters of the pixels in the individual pixel rows, a set of pixel rows, and selecting the one or more identified pixel rows from the set of pixel rows.

20. A system configured to identify a horizon in an image, the system comprising:
one or more physical processors configured by machine-readable instructions to:
obtain information defining an image, the image comprising an array of pixels, the array including pixel rows, individual pixels in the array associated with parameter values for a set of pixel parameters, the set of pixel parameters including one or more of a first color parameter, a second color parameter, a third color parameter, a fourth color parameter, a first image gradient parameter, a second image gradient parameter, or a gradient magnitude parameter, individual pixel rows in the array associated with secondary parameter values for the set of pixel parameters, the secondary parameter values determined based on an average, a weighted average, a median, a mode, and/or an entropy of corresponding parameter values of the pixels in the individual pixel rows;
identify one or more of the pixel rows of the image as depicting the horizon in the image based on the secondary parameter values; and
effectuate an image effect based on the identification of the one or more identified pixel rows of the image as depicting the horizon in the image, the image effect including an overlaying of text at or near the one or more identified pixel rows, a scrolling of text across the one or more identified pixel rows, a scrolling of text above or below the one or more identified pixel rows, a fading in or a fading out at the one or more identified pixel rows, or an adjustment of crop position based on the one or more identified pixel rows.

\* \* \* \* \*

UNITED STATES PATENT AND TRADEMARK OFFICE
CERTIFICATE OF CORRECTION

| | | |
|---|---|---|
| PATENT NO. | : 11,704,903 B2 | Page 1 of 1 |
| APPLICATION NO. | : 17/118280 | |
| DATED | : July 18, 2023 | |
| INVENTOR(S) | : Vincent Garcia | |

It is certified that error appears in the above-identified patent and that said Letters Patent is hereby corrected as shown below:

In the Claims

In Claim 3, Column 13, Line 28, please replace "corre p nds" with --corresponds--, therefor.

Signed and Sealed this
Twenty-second Day of August, 2023

*Katherine Kelly Vidal*

Katherine Kelly Vidal
*Director of the United States Patent and Trademark Office*